(12) United States Patent
Robinson et al.

(10) Patent No.: US 12,010,428 B2
(45) Date of Patent: Jun. 11, 2024

(54) CONTROLLING A LINE OF SIGHT ANGLE OF AN IMAGING PLATFORM

(71) Applicant: Planet Labs PBC, San Francisco, CA (US)

(72) Inventors: M. Dirk Robinson, Menlo Park, CA (US); Jonathan Dyer, Menlo Park, CA (US); Joshua Levine, San Jose, CA (US); Brendan Hermalyn, San Francisco, CA (US); Ronny Votel, San Jose, CA (US); Matt William Messana, Sunnyvale, CA (US)

(73) Assignee: PLANET LABS PBC, San Francisco, CA (US)

( * ) Notice: Subject to any disclaimer, the term of this patent is extended or adjusted under 35 U.S.C. 154(b) by 0 days.

(21) Appl. No.: 17/737,554

(22) Filed: May 5, 2022

(65) Prior Publication Data
US 2022/0264014 A1 Aug. 18, 2022

Related U.S. Application Data

(63) Continuation of application No. 16/585,516, filed on Sep. 27, 2019, now Pat. No. 11,330,180, which is a continuation of application No. 15/230,785, filed on Aug. 8, 2016, now Pat. No. 10,432,866.
(Continued)

(51) Int. Cl.
H04N 23/68 (2023.01)
G01C 11/02 (2006.01)
G02B 27/64 (2006.01)

(52) U.S. Cl.
CPC ........... *H04N 23/687* (2023.01); *G01C 11/02* (2013.01); *G02B 27/64* (2013.01);
(Continued)

(58) Field of Classification Search
CPC ....... B66F 11/048; G02B 26/06; G02B 7/003; G02B 23/00
(Continued)

(56) References Cited

U.S. PATENT DOCUMENTS 5,550,669 A 8/1996 Patel
5,672,866 A 9/1997 Messina
(Continued)

FOREIGN PATENT DOCUMENTS

EP 0917103 5/1999

OTHER PUBLICATIONS

EPO Office Action for 16760238.2, dated Dec. 10, 2018, 6 pages.
PCT International Search Report for corresponding PCT Application No. PCT/US2016/045990, dated Oct. 25, 2016, 3 pages.

*Primary Examiner* — Xi Wang
(74) *Attorney, Agent, or Firm* — Dority & Manning, P.A.

(57) ABSTRACT

Systems and methods of capturing imagery are provided. In particular, an imaging platform can be configured to capture imagery using a dual-axis steering mirror and one or more image capture devices. The line of sight angle of the imaging platform can be controlled by controlling the motion of the steering mirror in accordance with a motion profile. In example embodiments, the motion profile can correspond to a sawtooth wave. The imaging platform can further include one or more position sensors used to determine a position and/or orientation of the imaging platform along a path on which the imaging platform travels. The motion of the steering mirror can then be controlled to rotate about a first axis and a second axis to compensate for line of sight errors based at least in part on the determined position and/or orientation.

20 Claims, 4 Drawing Sheets

Related U.S. Application Data

(60) Provisional application No. 62/202,391, filed on Aug. 7, 2015.

(52) U.S. Cl.
CPC ....... *H04N 23/6811* (2023.01); *H04N 23/685* (2023.01); *H04N 23/6812* (2023.01)

(58) Field of Classification Search
USPC ...... 359/198.1, 199.1, 199.4, 212, 2, 214, 1; 348/95; 250/201.1
See application file for complete search history.

(56) References Cited

U.S. PATENT DOCUMENTS

| | | | |
|---|---|---|---|
| 6,396,961 B1 | 5/2002 | Wixson et al. | |
| 6,837,587 B1 | 1/2005 | Hughes | |
| 7,796,314 B2 * | 9/2010 | Sutko ................. | G02B 21/0048 |
| | | | 359/198.1 |
| 9,052,571 B1 | 6/2015 | Lapstun et al. | |
| 10,432,866 B2 * | 10/2019 | Robinson ............... | G02B 27/64 |
| 11,330,180 B2 * | 5/2022 | Robinson ............ | H04N 23/685 |
| 2008/0068721 A1 | 3/2008 | Murnan et al. | |
| 2008/0083886 A1 | 4/2008 | Faklis et al. | |
| 2008/0105829 A1 | 5/2008 | Faris et al. | |
| 2010/0231895 A1 * | 9/2010 | Mann ..................... | G01B 9/021 |
| | | | 356/72 |
| 2013/0265413 A1 * | 10/2013 | Riddle ................. | G01J 3/0229 |
| | | | 348/95 |
| 2013/0142500 A1 | 11/2013 | Cowdery-Coran | |
| 2016/0261798 A1 | 9/2016 | Ishikawa et al. | |

* cited by examiner

CONTROLLING A LINE OF SIGHT ANGLE OF AN IMAGING PLATFORM

PRIORITY CLAIM

The present application is a continuation of U.S. application Ser. No. 16/585,516 having a filing date of Sep. 27, 2019, which is a continuation of U.S. application Ser. No. 15/230,785 having a filing date of Aug. 8, 2016, which claims the benefit of U.S. Provisional Application Ser. No. 62/202,391 filed Aug. 7, 2015. Applicant claims priority to and the benefit of each of such applications and incorporate all such applications herein by reference in its entirety.

FIELD

The present disclosure relates generally to imaging and more particularly to controlling a position of an image capture device using vibrations.

BACKGROUND

Capturing high precision images of geographic regions, and providing the images to interested parties has become a popular service in recent years. Such images can be of interest to a wide variety of individuals and organizations, including geographers, researchers, meteorologists, scientists, map service providers, government agencies, amateur photography enthusiasts, etc. Such images can be captured, for instance, using image capture devices mounted on air-based vehicles, such as satellites or aircrafts, or ground-based vehicles, such as automobiles. The image capture devices can capture images of a scene as the vehicle travels along a path. The captured images can then be sent to a remote computing device (e.g. a server) for processing to generate one or more processed images.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of capturing imagery. The method includes determining, by one or more computing devices, a motion profile for a dual-axis steering mirror associated with an imaging platform. The method further includes controlling, by the one or more computing devices, the motion of the steering mirror based at least in part on the motion profile. The method further includes determining, by the one or more computing devices, position information indicative of an orientation of the imaging platform at one or more points along a path on which the imaging platform travels. The method further includes controlling, by the one or more computing devices, the motion of the steering mirror based at least in part on the position information. Controlling the motion of the steering mirror comprises controlling the steering mirror to rotate about a first axis and a second axis.

Other example aspects of the present disclosure are directed to systems, apparatus, tangible, non-transitory computer-readable media, user interfaces, memory devices, and electronic devices for capturing imagery.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
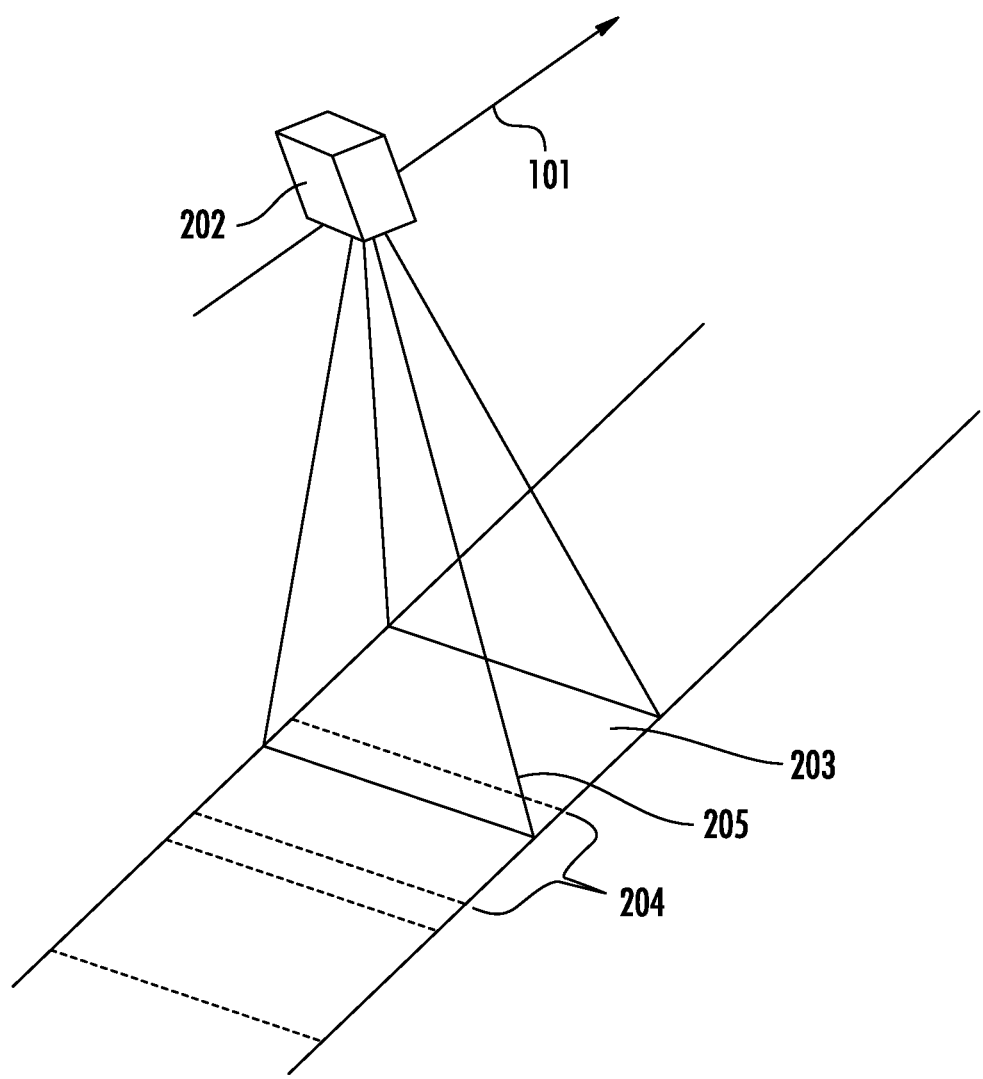
FIG. 1 depicts an example imaging platform according to example embodiments of the present disclosure.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are generally directed to capturing geographic imagery. More particularly, example aspects of the present disclosure are directed to compensating for blur in images caused by the motion of a region of interest relative to an image capture device configured to capture one or more images of the region of interest. For instance, an image capture device can be located on an imaging platform traveling at various speeds. The imaging platform can be an overhead imaging platform, such as a satellite, an airplane, a helicopter, an unmanned aerial vehicle (UAV), a drone, a balloon, etc. In alternative embodiments, the imaging platform can be a ground-based vehicle, such as an automobile. The relative motion between the region of interest and the imaging platform can cause blur and/or distortions in images captured by an image capture device, which can cause a low signal-to-noise ratio in the images.

Various conventional techniques have been used to eliminate or reduce such relative motion to eliminate or reduce blur and/or distortions in images. For instance, such techniques can include slewing the imaging platform against the relative motion. As another example, techniques for reducing relative motion can include introducing complex optical elements such as fast scan mirrors or custom sensors, such as time-delayed integration (TDI) charge-coupled devices. Such techniques may require the imaging platform to be extremely stable and/or well-controlled during image collection to ensure that the relative motion of the imaged region is perpendicular to the one-dimensional image sensor. Any deviation of the orientation or relative speed of the imaged region during collection may result in irregular image sampling and therefore distortion in the collected images. This concern may be magnified in multispectral systems where stability should be maintained across the multiple line scan or TDI sensors.

According to example embodiments of the present disclosure, a dual-axis fast steering mirror can be implemented in an imaging platform to compensate for relative motion between the imaging platform and the region of interest. As used herein, "relative motion" can be defined as the motion of a moving or stationary object in relation to another moving or stationary object. The steering mirror can be implemented within the imaging platform such that the steering mirror is configured to reflect light from at least a portion of a region of interest to an image capture device (e.g. imaging sensor) associated with the imaging platform. The steering mirror can be configured to rotate about two axes. In particular, the rotational motion of the steering mirror can be controlled to compensate for relative motion. In this manner, blur and/or distortions in images captured by the imaging platform may be reduced or eliminated.

In example embodiments, the rotational motion of the steering mirror can be controlled in accordance with a motion profile. The motion profile can correspond to a sawtooth wave that gradually ramps upward and then drops sharply over a plurality of periods. The motion profile can be determined such that a line of sight angle of one or more image capture devices associated with the imaging platform changes to reduce or eliminate relative motion. In particular, the motion profile can be determined such that, while the line of sight angle of the imaging platform corresponds to the ramping portion of the sawtooth wave, relative motion between the region of interest and the imaging platform is reduced or eliminated. In this manner, the line of sight angle can be moved from a first line of sight angle to a second line of sight angle. The rate at which the line of sight angle changes from the first line of sight angle to the second line of sight angle can correspond to the relative speed between the region of interest and the imaging platform.

The duration of the ramping portion of the sawtooth wave can be determined to facilitate a sufficient integration time period. In this manner, the integration period can correspond to the time period during which relative motion is reduced or eliminated as the steering mirror is controlled in accordance with the motion profile. In example embodiments, a sufficient integration period can be an integration period of between about 2 milliseconds and about 3 milliseconds. As used herein, the term "about," when used in reference to a numerical value, is intended to refer to within 40% of the numerical value. During the integration period, the image capture device(s) associated with the imaging platform can be controlled such that a shutter of the image capture devices(s) opens and one or more images of the region of interest are captured.

When the line of sight angle reaches the second line of sight angle, the motion of the steering mirror can be controlled such that the line of sight angle "snaps back" from the second line of sight angle to the first line of sight angle over a snapback period. In example embodiments, the snapback period can be between about 0.2 milliseconds to about 0.5 milliseconds. The steering mirror can then be controlled to move the line of sight angle in accordance with the subsequent ramping up portion of the sawtooth wave.

As indicated above, one or more images can be captured by the image capture device(s) during the integration period. Such image capture device(s) may correspond to a two-dimensional (2D) staring sensor array configured to acquire entire 2D frames taken as snapshots while the imaging platform travels along a track. The imaging platform can be designed such that neighboring images captured by the image capture device(s) contain overlapping measurements of the region of interest. The presence of overlapping regions in the output images allows for later image processing to register neighboring image frames and to mosaic the images together to reconstruct an image of the region of interest.

In example embodiments, the motion of the dual-axis steering mirror can further be controlled based at least in part on real time feedback to further compensate for relative motion between the imaging platform and the region of interest. In particular, the imaging platform may include one or more motion sensors (e.g. gyroscopes, accelerometers, etc.) configured to detect position information associated with an orientation of the imaging platform relative to the track along which the imaging platform travels. Such detected position information can then be compared with the motion profile of the steering mirror to determine any deviations in the actual motion of the steering mirror from the motion profile. In example embodiments, such deviations may be caused by vibration (e.g. jitter or other vibrations) of the imaging platform, or various other factors. Such deviations may cause line of sight errors in the imaging platform. If any deviations are identified, the motion of the steering mirror and/or the imaging platform can be further controlled to compensate for the identified deviations.

Compensation for the identified deviations can include controlling the steering mirror to rotate along one or more axes. For instance, such deviations may cause deviations in the line of sight (e.g. line of sight errors) of the imaging platform in the direction of travel of the imaging platform, or in a direction perpendicular to the direction of travel. Such line of sight deviations can be reduced or eliminated by controlling the motion of the steering mirror along one or more axes to compensate for the line of sight errors.

In example embodiments, the real time compensation can be further based on the one or more images captured by imaging platform. As indicated above, the one or more image frames may be registered and mosaicked together to reconstruct an image of the region of interest. The mosaicked images may be analyzed to identify any misalignments between the captured image frames. Such misalignments can be indicative of errors in the imaging platform control. In this manner, the steering mirror may further be controlled to rotate about one or more axes based on the identified misalignments. In further embodiments, the captured images may be analyzed to identify blurring and/or distortions in the images. The motion of the steering mirror can further be controlled to compensate for any identified blurring and/or distortions.

Example Imaging Platforms

FIG. 1 depicts an example imaging platform according to example embodiments of the present disclosure. In particular, FIG. 1 depicts an imaging satellite 202 having an optical payload comprising one or more image capture devices. Imaging satellite 202 can travel along a path above a region of interest. The path may include one or more straight lines or segments, or may be a curved path. Imaging satellite 202 can be flown at a height over the region of interest. Image samples can be obtained during the travel of the satellite and can be assembled into an output image, for instance, at a server on the ground via digital processing. Imaging satellite 202 may be configured to capture panchromatic and/or multispectral data using the one or more image capture devices. Imaging satellite 202 may be configured to collect image samples over multiple spectral channels. For instance, imaging satellite 202 may include a two-dimensional (2D) staring sensor that can be configured to obtain a two-dimensional image frame 203 in a single snapshot.

In example embodiments, the imaging satellite 202 may be configured to capture a plurality of image frames 203, 204 in succession, each having at least some amount of overlap 205 with one or more neighboring image frames (e.g. image frames immediately before or after the image frame). In example embodiments, the staring sensor can comprise a complementary metal-oxide-semiconductor (CMOS) sensor and/or a charge coupled device (CCD) sensor. The staring sensor can include an array of photodiodes. In some embodiments, the staring sensor can further include an active-pixel sensor (APS) comprising an integrated circuit containing an array of pixel sensors. Each pixel sensor can include a photodiode and an active amplifier. In further example embodiments, the staring sensor (and/or other components of an overhead imaging platform) may be radiation hardened to make it more resistant to damage from ionizing radiation in space.

It will be appreciated that various other suitable sensors associated with the image capture devices may be used to capture the image samples as the imaging platform travels along the path over the region of interest. Such sensors can include, for instance, line scan sensors, time delay integration (TDI) sensors, color wheel type 2D staring sensors, and color filter array (CFA) sensors. It will be further appreciated that various suitable image capture techniques can be used to capture images using the various sensors.

Figure 2:
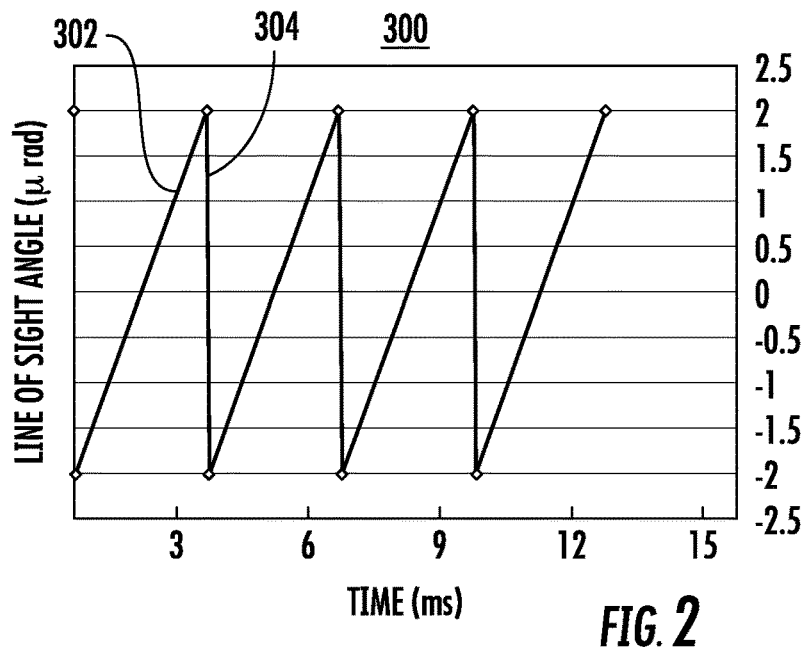
FIG. 2 depicts a plot of an example motion profile for a steering mirror according to example embodiments of the present disclosure.

FIG. 2 depicts an example plot of a motion profile 300 according to example embodiments of the present disclosure. As indicated above, a motion profile can be determined for a steering mirror in an imaging platform. The motion profile can correspond to a sawtooth wave that gradually ramps upward and then drops sharply over a plurality of time periods. Although a sawtooth wave is depicted in FIG. 2, it will be appreciated that various other motion profiles can be used. In example embodiments, the motion of the steering mirror can be controlled in accordance with the motion profile, such that an optical line of sight angle of the imaging platform is adjusted to compensate for relative motion between the imaging platform and a region of interest.

In particular, the sawtooth wave as depicted in FIG. 2 can have one or more ramp segments 302, and one or more snapback segments 304. Motion profile 300 can be determined such that relative motion is reduced or eliminated while the motion of the steering mirror corresponds to ramp segments 302. One or more images can be captured by an image capture device associated with the imaging platform during ramp segments 302 while relative motion is reduced or eliminated. For instance, ramp segments 302 can correspond to one or more integration periods during which a shutter is opened on the image capture device and one or more images are captured. In this manner, the slope and duration of ramp segments 302 can be determined to provide a desired integration period wherein relative motion is reduced or eliminated. In example embodiments, ramp segments 302 can be determined to provide an integration period of between about 2 milliseconds and about 5 milliseconds. It will be appreciated that various other suitable integration periods can be used.

As indicated above, ramp segments 302 can correspond to the motion of the steering mirror such that the line of sight of the imaging platform moves from a first line of sight angle to a second line of sight angle. In this manner, snapback segments 304 can correspond to the motion of the steering mirror such that the line of sight of the imaging platform moves from the second line of sight angle back to the first line of sight angle. During snapback segments 304, the shutter of the image capture device can be closed, such that no images are captured by the image capture device. In example embodiments, snapback periods 304 can correspond to a time period of between about 0.2 milliseconds and about 0.5 milliseconds.

In alternative embodiments, a motion profile can be determined such that the steering mirror rotates about two axes. In this manner, the line of sight angle of the imaging platform can be adjusted in a direction parallel to the track along which the imaging platform travels, and/or in a direction perpendicular to the track.

Example Methods of Controlling a Line of Sight Angle of an Imaging Platform

Figure 3:
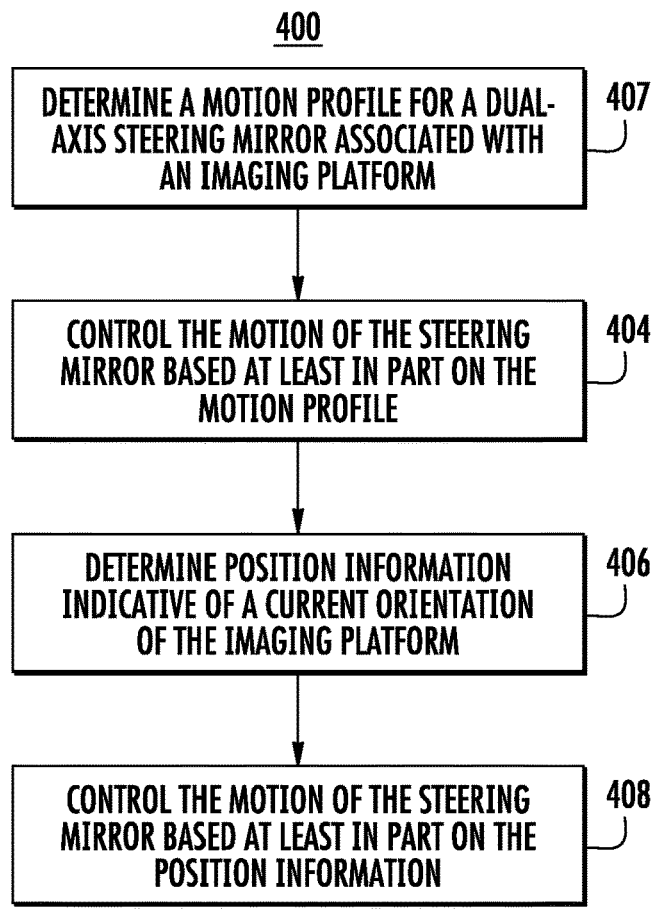
FIG. 3 depicts a flow diagram of an example method of controlling the motion of a steering mirror according to example embodiments of the present disclosure.

FIG. 3 depicts a flow diagram of an example method (400) of capturing imagery according to example embodiments of the present disclosure. Method (400) can be implemented by one or more computing devices, such as one or more of the computing devices depicted in FIG. 6. Additionally, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include determining a motion profile for a dual-axis steering mirror associated with an imaging platform. In particular, the steering mirror can be integrated in an optical system of the imaging platform. As described above, the motion profile can correspond to a sawtooth wave. The sawtooth wave can include a plurality of ramp segments and a plurality of snapback segments. The sawtooth wave can be determined such that the ramp segments have a slope that facilitates a reduced or eliminated relative motion between the imaging platform and a region of interest as the imaging platform travels along a track above the region of interest. In this manner, the slope of the ramp segments can be determined at least in part from a velocity of the imaging platform relative to the region of interest. The duration of the ramp segments can be determined to facilitate a suitable integration period, such that relative motion is reduced or eliminated for a suitable time period.

At (404), method (400) can include controlling the motion of the steering mirror based at least in part on the motion profile. In particular, when the motion of the steering mirror is controlled in accordance with the ramp segments of motion profile, the line of sight angle of the imaging platform can progress from a first line of sight angle to a second line of sight angle, such that relative motion between the imaging platform and the region of interest is reduced or eliminated. When the steering mirror is moved in accordance with the snapback segments, the line of sight angle of the imaging platform can progress from the second line of sight angle back to the first line of sight angle.

As the motion of the steering mirror is being controlled in accordance with the motion profile, one or more images can be captured during one or more integration periods. An integration period can correspond to at least a portion of a ramp segment of the sawtooth wave (e.g. when relative motion is reduced or eliminated). During at least a portion of the integration periods, a shutter of an image capture device associated with the imaging platform can be opened and one or more images can be captured. When the steering mirror reaches a position corresponding to the second line of sight angle, the shutter can be closed and the steering mirror can be snap back to a position corresponding to the first line of sight angle.

At (406), method (400) can include determining position information associated with the imaging platform. The position information can correspond to an orientation of the imaging platform as the imaging platform travels along the track over the region of interest. In example embodiments, the position information can be determined using one or sensors, such as one or more position and/or motion sensors. For instance, the sensors can include one or more accelerometers, gyroscopes, relative position (e.g. capacitive, inductive, etc.) sensors, angular rate sensors, and/or various other suitable sensors.

In particular, the position information, as detected by the one or more sensors, may be indicative of a line of sight error of the imaging platform. For instance, an actual line of sight angle of the imaging platform may have one or more errors relative to a desired line of sight angle. The line of sight errors can be errors in speed and/or direction such as a direction parallel to the travel path of the imaging platform or other direction. Line of sight errors may be caused by a number of factors, such as for instance, vibration and/or jitter associated with the imaging platform.

At (408), method (400) can include controlling the motion of the steering mirror based at least in part on the position information. In particular, the motion of the steering mirror can be controlled to compensate for any determined line of sight errors. In example embodiments, the steering mirror can be controlled to rotate about one or more axes to compensate for the line of sight errors. For instance, the steering mirror can be controlled to rotate about an axis parallel to the direction of the travel path of the imaging platform and/or an axis perpendicular to the direction of the travel path of the imaging platform. In this manner, the line of sight angle of the imaging platform may be adjusted in multiple directions in accordance with the rotational motion of the steering mirror. In example embodiments, controlling the rotational motion of the steering mirror about two axes may lessen the accuracy requirements of the control of the orientation of the imaging platform.

Figure 4:
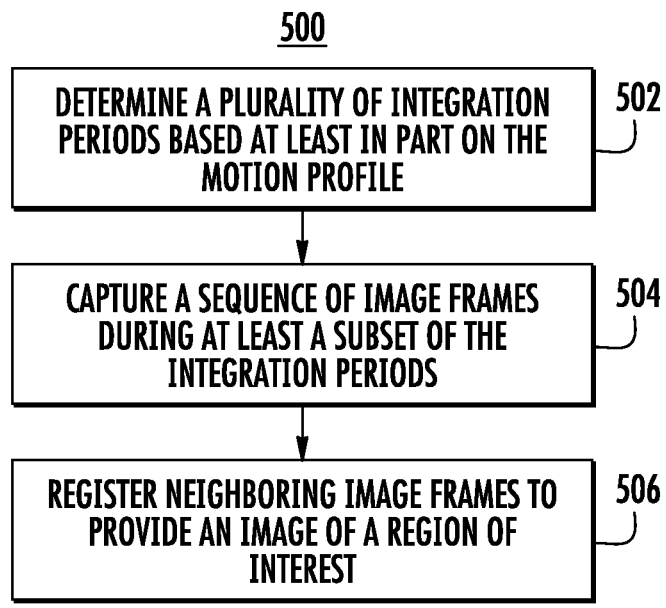
FIG. 4 depicts a flow diagram of an example method of capturing imagery according to example embodiments of the present disclosure.

As indicated above, one or more images can be captured by the imaging platform as the imaging platform travels along a path. For instance, FIG. 4 depicts a flow diagram of an example method of capturing imagery according to example embodiments of the present disclosure. At (502), method (500) can include determining a plurality of integration periods. In example embodiments, the integration periods can be determined at least in part from the motion profile of the steering mirror, such as the motion profile determined in (402) of method (400). In particular, an integration period can correspond to a period of time during the motion profile wherein relative motion between the imaging platform and the region of interest is reduced or eliminated. For instance, in embodiments wherein the motion profile corresponds to a sawtooth wave as described above, an integration period can correspond to at least a portion of a ramp segment of the sawtooth wave.

At (504), method (500) can include capturing a sequence of image frames of at least a portion of a region of interest during at least a subset of the integration periods. In example embodiments, the images may be captured by an image capture device having a two-dimensional staring sensor. As described above, the sequence of image frames can be captured such that neighboring image frames include overlapping measurements of the region of interest. The amount of overlap can correspond to a size capture area of the staring sensor, a frequency at which images are captured, and/or the distance between the imaging platform and the captured target (e.g. region of interest). In this manner, the integration periods (and/or the motion profile) can be determined such that the integration periods are spaced a distance apart to facilitate images captured at a frequency that provides suitable overlapping measurements. For instance, the snapback segments of the motion profile can be determined such that the integration periods (e.g. ramp segments) facilitate images captured at a frequency that provides overlapping measurements of the region of interest among neighboring image frames.

At (506), method (500) can include registering neighboring image fames to provide a reconstructed image of the region of interest. Registering the image frames, otherwise referred to as "mosaicing", may include linking successive image frames together to form a final reconstructed image. Registration can be based at least in part on the correlation of the image data and/or the overlap between successive sub-images. In example embodiments, by registering many separate similar images together, the final reconstructed image captured by a staring sensor can correct for deviations in the motion of the imaging platform from the expected direction of travel 101, including deviations in speed and/or direction.

Figure 5:
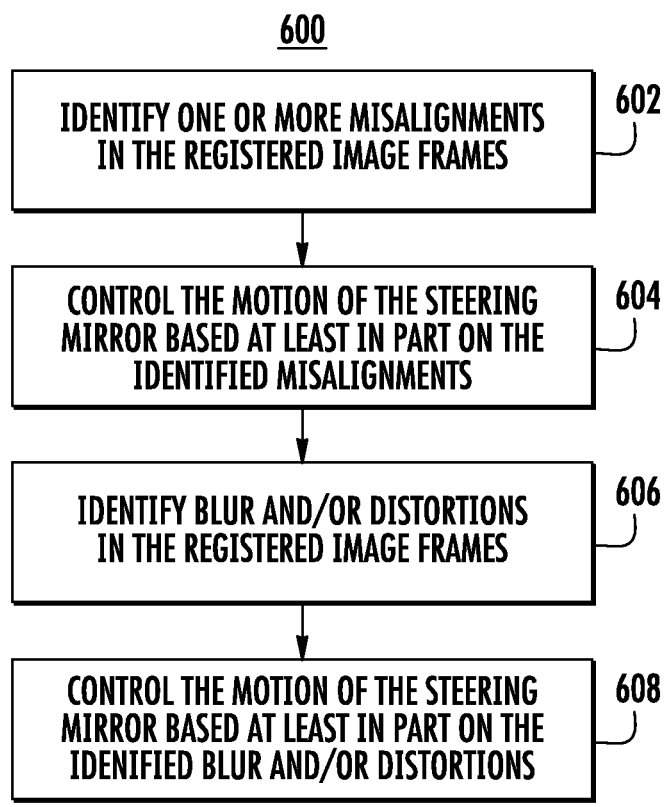
FIG. 5 depicts a flow diagram of an example method of controlling the motion of a steering mirror according to example embodiments of the present disclosure.

The motion of the steering mirror of the imaging platform can further be controlled based at least in part on the images generated by the imaging platform. In this manner, the generated images may provide real-time feedback used to control the motion of the steering mirror. For instance, FIG. 5 depicts a flow diagram of an example method (600) of controlling the motion of a steering mirror according to example embodiments. At (602), method (600) can include identifying one or more misalignments in the registered image frames. For instance, the one or more misalignments may be identified at least in part from the overlapping measurements of the neighboring frames. The misalignments may be caused by deviations in the line of sight of the imaging platform from a desired line of sight. The deviations may be due to errors in the control of the imaging platform, such as errors in direction and/or speed.

At (604), method (600) can include controlling the motion of the steering mirror based at least in part on the identified misalignments. In particular, the motion of the steering mirror can be controlled to compensate for the deviations in the line of sight of the imaging platform. In this manner, misalignments in registered images may be reduced or eliminated. In example embodiments, the motion of the steering mirror can be controlled such that the steering mirror rotates about one or more axes to compensate for the deviations in line of sight. For instance, the deviations can include deviations in the direction parallel to the travel path of the imaging platform and/or other direction. The steering mirror can be controlled to rotate about an axis parallel to the direction of travel and/or an axis perpendicular to the direction of travel. In alternative embodiments, the steering mirror may be controlled to rotate about one or more other suitable associated axes in other suitable directions to compensate for any identified misalignments and/or line of sight errors.

At (606), method (600) can include identifying blur and/or distortions in the registered image frames. As described above, blur and/or distortions in images captured by the imaging platform may correspond to relative motion between the imaging platform and a region of interest of which the images are captured. For instance, as objects in a region of interest move, an image of that region of interest can represent an integration of all positions of those objects, as well as the viewpoint of the image capture device, over the period of exposure (e.g. integration time) determined by a shutter speed of the image capture device. In such an image, any object moving relative to the image capture device may look blurred and/or smeared along the direction of relative motion. This blurring and/or smearing may occur on an object that is moving or on a static background if the image capture device is moving.

At (608), method (600) can include controlling the motion of the steering mirror based at least in part on the identified blur. In particular, the motion of the steering mirror can be controlled based on the identified blur to reduce or eliminate relative motion between the imaging platform and the region of interest, and thereby to reduce or eliminate blur in images captured by the imaging platform. As described above, the steering mirror can be controlled to rotate about one or more axes to reduce or eliminate the relative motion. For instance, the steering mirror may be controlled to rotate about an axis parallel to the direction of travel of the imaging platform, an axis perpendicular to the direction of travel of the imaging platform and/or other suitable direction.

Example Systems for Capturing Imagery

Figure 6:
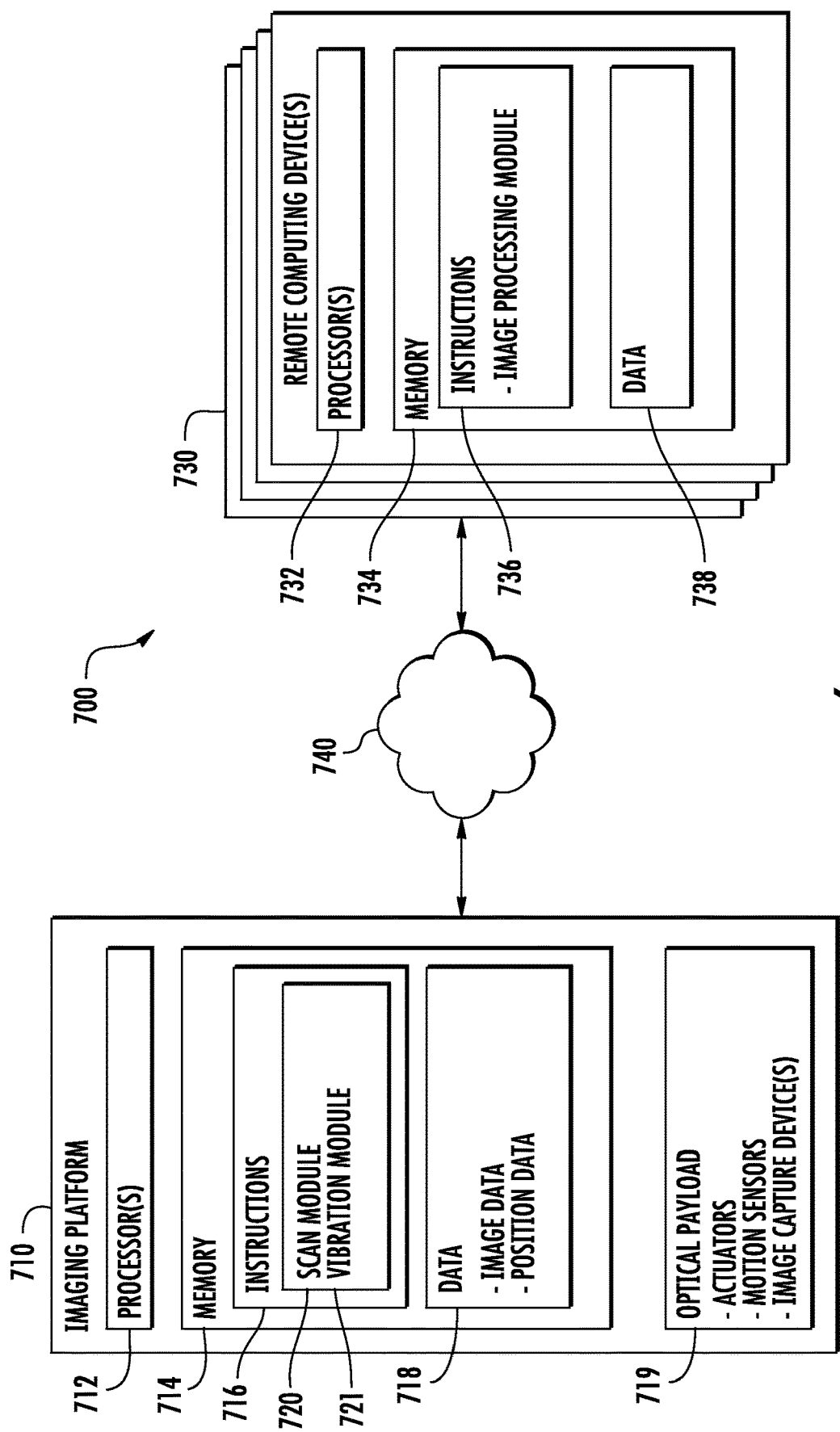
FIG. 6 depicts an example system according to example embodiments of the present disclosure.

FIG. 6 depicts a computing system 700 that can be used to implement the methods and systems for capturing imagery according to example embodiments of the present disclosure. System 700 can be implemented using a client-server architecture that includes an imaging platform 710 that can communicate with one or more remote computing devices 730 (e.g. servers) over a network 740. System 700 can be implemented using other suitable architectures, such as a single computing device.

Imaging platform 710 can be any suitable type of imaging platform, such as a satellite, airplane, helicopter, unmanned aerial vehicle (UAV), drone, balloon, ground-based vehicle, etc. Imaging platform 710 can include one or more processor(s) 712 and one or more memory devices 714.

The one or more processor(s) 712 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 714 can include one or more computer-readable media, including, but not limited to, non-transitory computer-readable media, RAM, ROM, hard drives, flash drives, or other memory devices. In alternative embodiments, the systems and method provided herein may be implemented using analog circuitry. For instance, analog circuitry (or a combination of analog and digital circuitry) may be used to induce vibration in imaging platform 710 in accordance with example embodiments of the present disclosure.

The one or more memory devices 714 store information accessible by the one or more processors 712, including instructions 716 that can be executed by the one or more processors 712. For instance, the memory devices 714 can store instructions 716 for implementing a scanner 720 configured to scan a region of interest and capture one or more images during one or more integration periods. The memory devices 714 can further store instructions 716 for implementing a controller 721. Controller 721 can be configured to control the motion of a steering mirror associated with the imaging platform based at least in part on one or more signals received from one or more position and/or motion sensors associated with the imaging platform, and/or one or more characteristics of images captured by the imaging platform, as described above.

It will be appreciated that, in example embodiments, scanner 720 and/or controller 721 can include computer logic utilized to provide desired functionality. Thus, scanner 720 and/or controller 721 can be implemented in hardware, application specific circuits, firmware and/or software controlling a general purpose processor. In one embodiment, scanner 720 and/or controller 721 can be program code files stored on the storage device, loaded into one or more memory devices and executed by one or more processors or can be provided from computer program products, for example computer executable instructions, that are stored in a tangible computer-readable storage medium such as RAM, flash drive, hard disk or optical or magnetic media. When software is used, any suitable programming language or platform can be used to implement scanner 720 and/or controller 721.

The one or more memory devices 714 can also include data 718 that can be retrieved, manipulated, created, or stored by the one or more processors 712. The data 718 can include, for instance, image data, position data, and other data.

Imaging platform 710 can further include an optical payload 719. Optical payload 719 can be configured to capture one or images of a region of interest, and can include one or more motion and/or position sensors, and one or more image capture devices having a dual-axis fast steering mirror and a two-dimensional staring sensor.

Imaging platform 710 can also include a network interface used to communicate with one or more remote computing devices (e.g. remote computing device 730) over the network 740. The network interface can include any suitable components for interfacing with one more networks, including for example, transmitters, receivers, ports, controllers, antennas, or other suitable components.

The system 700 includes one or more remote computing device(s) 730, such as web or application servers. An example remote computing device 730 can host or be configured to receive one or more images from imaging platform 710 and process the images to generate one or more processed images. Remote computing device 730 can be implemented using any suitable computing device(s). The server 730 can have one or more processors 732 and memory 734. The memory 734 can store instructions 736 and data 738. For instance, the memory 734 can store instructions for implementing an image processor. The server 730 can also include a network interface used to communicate with imaging platform 710 over the network 740. The network interface can include any suitable components for interfacing with one more networks, including for example, transmitters, receivers, ports, controllers, antennas, or other suitable components.

The network 740 can be any type of communications network, such as a local area network (e.g. intranet), wide area network (e.g. Internet), cellular network, or some combination thereof. The network 740 can also include a direct connection between imaging platform 710 and remote computing device 730. In general, communication between remote computing device 730 and imaging platform 710 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of controlling an imaging platform, the method comprising:
    determining a motion profile for a dual-axis steering mirror associated with an imaging platform, wherein the motion profile is determined, at least in part, such that a line of sight angle of one or more imaging devices associated with the imaging platform changes to reduce or eliminate relative motion between the imaging platform and a region of interest;
    controlling the motion of the dual-axis steering mirror based at least in part on the motion profile to capture a sequence of image frames of at least a portion of a region of interest during one or more integration time periods, wherein the motion profile controls the motion of the dual-axis steering mirror to rotate about a first axis and a second axis during the one or more integration time periods as the imaging platform travels along a path on which the imaging platform travels;
    linking successive image frames together based on one or more overlapping regions within the sequence of image frames to form a reconstructed image; and
    modifying the motion of the dual-axis steering mirror based on the motion profile, to rotate about the first axis and the second axis based on correcting one or more misalignments within the reconstructed image.

2. The computer-implemented method of claim 1, wherein linking successive image frames together further comprises:
    determining an amount of overlap within the one or more overlapping regions corresponding to a size capture area of a staring sensor; and
    determining the one or more integration time periods such that the one or more integration time periods are spaced a distance apart to capture the sequence of image frames at a frequency that provides overlapping measurements the size of the capture area of the staring sensor.

3. The computer-implemented method of claim 1, wherein linking successive image frames together further comprises:
    determining an amount of overlap within the one or more overlapping regions corresponding to a frequency at which the image frames are captured; and
    determining the one or more integration time periods such that the one or more integration time periods are spaced a distance apart to capture the sequence of image frames at the frequency, wherein a region of interest is overlapped among neighboring image frames.

4. The computer-implemented method of claim 1, wherein linking successive image frames together further comprises:
    determining an amount of overlap within the one or more overlapping regions corresponding to a distance between the imaging platform and a region of interest; and
    determining the one or more integration time periods such that the one or more integration time periods are spaced a distance apart to capture the sequence of image frames at a frequency that provides overlapping measurements that are a size of the region of interest.

5. The computer-implemented method of claim 1, wherein neighboring image fames are registered to provide the reconstructed image of a region of interest.

6. The computer-implemented method of claim 5, wherein registration is based at least in part on a correlation of a portion of image data and an overlap between successive sub-images.

7. The computer-implemented method of claim 5, wherein based on registering the neighboring image frames, deviations in the motion of the imaging platform from an expected direction of travel are corrected based on one or more misalignments within the reconstructed image.

8. The computer-implemented method of claim 1, the computer-implemented method further comprising:
    identifying blur in at least one of the captured image frames; and
    controlling the motion of the dual-axis steering mirror based at least in part on identified blur, wherein controlling the motion of the dual-axis steering mirror comprises controlling the dual-axis steering mirror to rotate about a first axis and a second axis.

9. The computer-implemented method of claim 1, wherein the motion profile comprises a sawtooth wave with one or more snapback segments according to which the dual-axis steering mirror is to be moved, and wherein the one or more snapback segments are determined such that the one or more integration time periods facilitate images captured at a frequency that provides overlapping measurements of a region of interest among neighboring image frames.

10. A computing system, comprising:
    one or more processors; and
    one or more memory devices, the one or more memory devices storing computer-readable instructions that when executed by the one or more processors cause the one or more processors to perform operations, the operations comprising:

determining a motion profile for a dual-axis steering mirror associated with an imaging platform, wherein the motion profile is determined, at least in part, such that a line of sight angle of one or more imaging devices associated with the imaging platform changes to reduce or eliminate relative motion between the imaging platform and a region of interest;

controlling the motion of the dual-axis steering mirror based at least in part on the motion profile to capture a sequence of image frames of at least a portion of a region of interest during one or more integration time periods, wherein the motion profile controls the motion of the dual-axis steering mirror to rotate about a first axis and a second axis during the one or more integration time periods as the imaging platform travels along a path on which the imaging platform travels;

linking successive image frames together based on one or more overlapping regions within the sequence of image frames to form a reconstructed image; and modifying the motion of the dual-axis steering mirror to rotate about the first axis and the second axis based on correcting one or more misalignments within the reconstructed image.

11. The computing system of claim 10, the operations further comprising:

determining an amount of overlap within the one or more overlapping regions corresponding to a size capture area of a staring sensor; and determining the one or more integration time periods such that the one or more integration time periods are spaced a distance apart to capture the sequence of image frames at a frequency that provides overlapping measurements the size of the capture area of the staring sensor.

12. The computing system of claim 10, the operations further comprising:

determining an amount of overlap within the one or more overlapping regions corresponding to a frequency at which the image frames are captured; and determining the one or more integration time periods such that the one or more integration time periods are spaced a distance apart to capture the sequence of image frames at the frequency, wherein a region of interest is overlapped among neighboring image frames.

13. The computing system of claim 10, the operations further comprising:

determining an amount of overlap within the one or more overlapping regions corresponding to a distance between the imaging platform and a region of interest; and determining the one or more integration time periods such that the one or more integration time periods are spaced a distance apart to capture the sequence of image frames at a frequency that provides overlapping measurements that are a size of the region of interest.

14. The computing system of claim 10, wherein neighboring image fames are registered to provide the reconstructed image of a region of interest.

15. The computing system of claim 14, wherein registration is based at least in part on a correlation of a portion of image data and an overlap between successive sub-images.

16. The computing system of claim 14, wherein based on registering the neighboring image frames, deviations in the motion of the imaging platform from an expected direction of travel are corrected based on one or more misalignments within the reconstructed image.

17. The computing system of claim 10, the operations further comprising:

identifying blur in at least one of the captured image frames; and controlling the motion of the dual-axis steering mirror based at least in part on identified blur, wherein controlling the motion of the dual-axis steering mirror comprises controlling the dual-axis steering mirror to rotate about a first axis and a second axis.

18. The computing system of claim 10, wherein the motion profile comprises a sawtooth wave with one or more snapback segments according to which the dual-axis steering mirror is to be moved, and wherein the one or more snapback segments are determined such that the one or more integration time periods facilitate images captured at a frequency that provides overlapping measurements of a region of interest among neighboring image frames.

19. A computer-implemented method of controlling an imaging platform, the method comprising:

determining a motion profile for a dual-axis steering mirror associated with an imaging platform, wherein the motion profile is determined, at least in part, such that a line of sight angle of one or more imaging devices associated with the imaging platform changes to reduce or eliminate relative motion between the imaging platform and a region of interest, wherein the motion profile comprises a sawtooth wave with one or more snapback segments according to which the dual-axis steering mirror is to be moved;

controlling the motion of the dual-axis steering mirror based at least in part on the motion profile to capture a sequence of image frames of at least a portion of a region of interest during one or more integration time periods, wherein the motion profile controls the motion of the dual-axis steering mirror to rotate about a first axis and a second axis during the one or more integration time periods as the imaging platform travels along a path on which the imaging platform travels; and linking successive image frames together based on one or more overlapping regions within the sequence of image frames to form a reconstructed image.

20. The computer-implemented method of claim 19, wherein the one or more snapback segments are determined such that the one or more integration time periods facilitate images captured at a frequency that provides overlapping measurements of a region of interest among neighboring image frames.

* * * * *